(12) United States Patent
Johnson et al.

(10) Patent No.: US 10,017,676 B2
(45) Date of Patent: Jul. 10, 2018

(54) FIBER BLENDS

(71) Applicant: DOWCO LLC, Akron, OH (US)

(72) Inventors: Todd D Johnson, Akron, OH (US); Paul M Standley, Dayton, OH (US)

(73) Assignee: DOWCO, LLC, Akron, OH (US)

( * ) Notice: Subject to any disclaimer, the term of this patent is extended or adjusted under 35 U.S.C. 154(b) by 73 days.

(21) Appl. No.: 15/145,183

(22) Filed: May 3, 2016

(65) Prior Publication Data

US 2016/0244649 A1 Aug. 25, 2016

Related U.S. Application Data

(63) Continuation of application No. 13/795,961, filed on Mar. 12, 2013, now Pat. No. 9,353,462.

(51) Int. Cl.
| C09K 3/16 | (2006.01) |
| C08L 21/00 | (2006.01) |
| C08L 77/06 | (2006.01) |
| D01F 6/90 | (2006.01) |
| D04H 1/541 | (2012.01) |
| B01D 39/16 | (2006.01) |
| D06M 13/402 | (2006.01) |
| D06M 11/74 | (2006.01) |
| C08L 7/00 | (2006.01) |
| C08L 19/00 | (2006.01) |
| D01F 6/60 | (2006.01) |
| C08L 77/10 | (2006.01) |

(52) U.S. Cl.
CPC ............ *C09K 3/16* (2013.01); *B01D 39/1623* (2013.01); *C08L 7/00* (2013.01); *C08L 19/003* (2013.01); *C08L 21/00* (2013.01); *C08L 77/06* (2013.01); *C08L 77/10* (2013.01); *D01F 6/605* (2013.01); *D01F 6/905* (2013.01); *D04H 1/541* (2013.01); *D06M 11/74* (2013.01); *D06M 13/402* (2013.01); *B01D 2239/0241* (2013.01); *B01D 2239/1225* (2013.01); *C08L 2205/02* (2013.01); *C08L 2205/16* (2013.01)

(58) Field of Classification Search
None
See application file for complete search history.

(56) References Cited

U.S. PATENT DOCUMENTS

| 3,803,453 | A | * | 4/1974 | Hull | ............ D01F 1/09 139/426 R |
| 3,849,242 | A | * | 11/1974 | Takeya | ........ D01F 8/08 260/DIG. 15 |
| 6,756,412 | B2 | | 6/2004 | Muzzy | |
| 7,344,667 | B2 | | 3/2008 | Honma | |
| 7,455,750 | B2 | * | 11/2008 | Conley | .......... D21H 13/26 162/157.3 |
| 2002/0142689 | A1 | * | 10/2002 | Levit | ............ C08J 5/04 442/381 |
| 2010/0323179 | A1 | * | 12/2010 | Kim | .......... D04H 1/4342 428/220 |

* cited by examiner

*Primary Examiner* — Katie L Hammer
(74) *Attorney, Agent, or Firm* — Renner Kenner Greive Bobak Taylor and Weber

(57) ABSTRACT

A fiber blend is provided that includes highly fibrillated aramid fibers and is easily dispersed in a polymer matrix. Embodiments of the fiber blend include highly-fibrillated aramid fibers; non-fibrillated aramid fibers; and an anti-static agent.

18 Claims, No Drawings

FIBER BLENDS

TECHNICAL FIELD

Embodiments of the present invention relate to fiber blends. In one or more embodiments, the fiber blends comprise short fibers, and more particularly, the blends comprise highly fibrillated short fibers, non-fibrillated short fibers, and an anti-static agent.

BACKGROUND OF THE INVENTION

Incorporation of short fibers, flocks, and pulps into mixtures of thermoplastic, thermoset, or crosslinkable polymers significantly alters the physical properties of such compositions which can enhance the performance properties of manufactured parts comprised solely or in-part of such compositions. The effect of the addition of such fibers will vary with the length, type and loading of these fibers. Fibers that have been employed include cotton, polyester, polyamide, polyaramide, PTFE, carbon, fiberglass, etc.

The physical dispersion of such fibers is frequently very difficult, often requiring extensive mixing in internal mixers, masticators, extruders, etc. Such extensive mixing breaks down the polymer (polymer chain breakage) effectively lowering the polymer's molecular weight, which is undesirable. There are numerous contributory causes for this dispersion difficulty: increasing surface area with decreasing fiber lengths, electrostatic build-up on many short fibers, moisture content, fiber treatments (if any, such as latexes, bonding agents, sizing, etc.). Clumping of short fibers aggravates this dispersion difficulty. Clumps must be broken up and the individual fibers 'wetted-out' by the polymer-containing compound in order for acceptable fiber dispersion to occur. Some fibers, such as highly fibrillated polyaramides, pose additional problems due to the irregularity of their surfaces.

The industry has attempted to address these problems by pre-blending difficult to disperse fibers with polymeric latexes, wetting agents, surfactants, oils, resins, etc., often as fiber 'master batches,' with limited success. The addition of partitioning agents such as silica can be somewhat effective in preventing fiber clumping, and conductive carbon blacks and some graphites are effective in dissipating electrostatic charges that build up during fiber processing.

However, a need continues to exist in the art for a fiber blend that will effectively disperse into a polymer composition with minimal mixing, while still imparting beneficial properties to the final product.

SUMMARY OF THE INVENTION

In one or more embodiments this invention provides a fiber blend comprising from about 5 to about 95 pbw phf of highly-fibrillated aramid fibers; from about 5 to about 95 pbw phf of non-fibrillated aramid fibers; and from about 0.05 to about 15 pbw phf of an anti-static agent.

In one or more embodiments, the present invention provides a method of preparing a polymer composite, the method comprising the steps of combining one or more polymers, a fiber blend comprising highly fibrillated fibers, non-fibrillated fibers, and an anti-static agent; and mixing to form a homogenous polymer composite, wherein the fiber blend is added directly to the polymers and is not pre-mixed with polymer.

In one or more embodiments, the present invention provides a method of preparing a rubber composition, the method comprising the steps of combining, in a first mixing stage, ingredients including one or more vulcanizable polymers, a fiber blend comprising highly fibrillated fibers, non-fibrillated fibers, and an anti-static agent, to form a homogenous vulcanizable polymer mixture, combining the vulcanizable polymer mixture with ingredients including one or more curatives, and curing the to the vulcanizable polymer mixture, wherein the fiber blend is added directly to the polymers and is not pre-mixed with polymer.

DETAILED DESCRIPTION OF ILLUSTRATED EMBODIMENTS

Embodiments of the present invention relate to fiber blends. In one or more embodiments, the fiber blends comprise short fibers, and more particularly, the blends comprise highly fibrillated short fibers, non-fibrillated short fibers, and an anti-static agent.

Short aramid fibers generally include fibers of small diameter and high aspect ratio. In one or more embodiments, the short fibers have a length of about 0.1 to about 8 mm (100 to 8000 microns). In one or more embodiments, the short fiber aspect ratio, which is the ratio of length to diameter, is from about 10:1 to about 1000:1, or higher.

In one or more embodiments, the highly fibrillated fibers include aramid fibers. Generally, aramid fibers include manufactured fibers in which the fiber-forming substance is a long-chain synthetic polyamide in which at least about 85% of the amide linkages are directly attached to two aromatic rings.

Aramid fibers include meta-aramids and para-aramids, as further described in U.S. Pat. No. 5,830,395, which is incorporated by reference herein. In one or more embodiments, the aramid fibers include para-aramids, such as polyparaphenyleneterephthalamide.

Fibrillation relates to fibers having an irregular shape, sometimes referred to as a branch structure. In one or more embodiments, highly fibrillated fibers are prepared by processing fibers in a manner that partially splits the main fiber such that the fibers that have been split will extend outward from the main fiber. A fiber can also be fibrillated by attaching smaller fibers to a main fiber. Short fibers that are also highly-fibrillated are sometimes referred to as fiber pulp.

In one or more embodiments, the highly-fibrillated aramid fibers may include a coating or other surface treatment. The fibers may be coated, as by epoxy, phenolic, resorcinol-formaldehyde, polyurethane, silicone, plasticizer, or the like, or may be treated with agents that alter handling behavior, adhesion properties, static charge retention, and the like. In other embodiments, the highly fibrillated fibers are devoid of any surface coating.

In one or more embodiments, the highly-fibrillated fibers may be characterized by a degree of fibrillation of at least about 30 percent, in other embodiments, at least about 40 percent, in other embodiments, at least about 50 percent, and in still other embodiments, at least about 55 percent. In one or more embodiments, the highly-fibrillated fibers may be characterized by a degree of fibrillation of from about 30 to about 90 percent.

In one or more embodiments, the highly-fibrillated fibers may be characterized by a specific surface area of from about 4 to about 15.5 square meters per gram ($m^2/g$), in other embodiments, from about 4.5 to about 10.5 $m^2/g$, and in other embodiments, from about 5 to about 8.5 $m^2/g$.

In one or more embodiments, the highly fibrillated fibers have an average length of about 0.1 to about 2.5 mm (100 to 2500 microns), in other embodiments, from about 0.3 to about 2.2 mm, in other embodiments, from about 0.5 to about 2.1 mm, and in other embodiments, from about 0.65 to about 2.0 mm.

In one or more embodiments, the amount of each component of the fiber blend may be expressed as the parts by weight of the component (pbw) per 100 parts by weight of total fiber in the blend (phf). In one or more embodiments, the amount of highly fibrillated fiber in the fiber blend is from about 5 to about 95 pbw phf, based upon the total weight of the fiber blend. In other embodiments, the fiber blend contains from about 10 to about 75 pbw phf, in other embodiments from about 15 to about 60 pbw phf, and in still other embodiments from about 20 to about 50 pbw phf of highly-fibrillated aramid fibers, based upon the total weight of the fiber blend.

In one or more embodiments, the fiber blend comprises short fibers that are non-fibrillated. By non-fibrillated fibers is meant fibers having a relatively low amount of fibrillation, i.e. less than 30%, in one or more embodiments, less than 20%. In one or more embodiments, the non-fibrillated fibers include aramid fibers.

In one or more embodiments, the non-fibrillated fibers have average fiber lengths on the order of microns, and may be referred to as micronized fibers. In one or more embodiments, the micronized fibers have an average fiber length of from about 50 microns to about 2000 microns, in other embodiments, from about 100 to about 1000 microns, in other embodiments, from about 150 to about 750 microns, and in other embodiments, from about 175 to about 500 microns.

In one or more embodiments, the micronized aramid fibers have a specific surface area that is lower than that of the highly fibrillated fibers. In one or more embodiments, the micronized aramid fibers have a specific surface area of from about 0.5 to about 2.5 $m^2/g$, in other embodiments, from about 1 to about 2 $m^2/g$.

In one or more embodiments, the micronized aramid fibers include a coating or other surface treatment. The fibers may be coated, as by epoxy, phenolic, resorcinol-formaldehyde, polyurethane, silicone, plasticizer, or the like, or may be treated with agents that alter handling behavior, adhesion properties, static charge retention, and the like. In other embodiments, the micronized fibers are devoid of any surface coating.

In one or more embodiments, the amount of micronized aramid fibers in the fiber blends of the present invention is from about 5 to about 95 pbw phf, based upon the total weight of the fiber blend. In other embodiments, the fiber blend contains from about 10 to about 85 pbw phf, in other embodiments from about 20 to about 80 pbw phf, and in still other embodiments from about 30 to about 75 pbw phf of micronized aramid fibers, based upon the total weight of the fiber blend.

In one or more embodiments, the fiber blend further comprises an anti-static agent. An anti-static agent is an additive that is thought to reduce the static charge that builds up when the fibers are produced and whenever they are mixed or further processed. In one or more embodiments, the anti-static agent is a carbon-based anti-static agent. Carbon-based anti-static agents include carbon fibers, pyrolytic graphite, and conductive carbon black. Examples of carbon fibers include PAN carbon fibers, i.e. carbon fibers formed using a polyacrylonitrile (PAN) precursor. Examples of carbon fibers also include milled carbon fibers and pitch-based carbon fibers. In one or more embodiments, the carbon fibers contain at least about 90 wt. % carbon.

In one or more embodiments, the carbon fibers may include a coating or other surface treatment. In other embodiments, the carbon fibers are devoid of any surface coating.

In one or more embodiments, the carbon fibers may be characterized by an average fiber length of from about 50 microns to about 1000 microns, in other embodiments from about 100 to about 500 microns, and in other embodiments, from about 150 to about 300 microns.

In one or more embodiments, the amount of carbon fibers in the fiber blend of the present invention is from about 0.05 to about 15 pbw phf, based upon the total weight of the fiber blend. In other embodiments, the fiber blend contains from about 0.5 to about 12 pbw phf, in other embodiments from about 1 to about 10 pbw phf, and in still other embodiments from about 2 to about 8 pbw phf of carbon fibers, based upon the total weight of the fiber blend.

Pyrolytic graphite may also be referred to as synthetic graphite or artificial graphite. It is generally characterized as a very high purity carbon material, being composed of about 99 wt. % carbon. Examples of commercially available products include Asbury A99 graphite from Asbury Corp. Conductive carbon black is also commercially available, for example as N472 from Cabot Corp.

In one or more embodiments, the pyrolytic graphite anti-static agent may be present in an amount of from about 0.1 to about 5 pbw phf, based upon the total weight of the fiber blend. In other embodiments, the fiber blend contains from about 0.5 to about 4 pbw phf, in other embodiments from about 0.7 to about 3 pbw phf, and in still other embodiments from about 1 to about 2 pbw phf of a pyrolytic graphite anti-static agent, based upon the total weight of the fiber blend.

In one or more embodiments, the conductive carbon black anti-static agent may be present in an amount of from about 0.1 to about 5 pbw phf, based upon the total weight of the fiber blend. In other embodiments, the fiber blend contains from about 0.5 to about 4 pbw phf, in other embodiments from about 0.7 to about 3 pbw phf, and in still other embodiments from about 1 to about 2 pbw phf of a conductive carbon black anti-static agent, based upon the total weight of the fiber blend.

Combinations of the above carbon-based anti-static agents may be employed. However, in one or more embodiments, the carbon fibers act as an antistatic agent, such that no additional antistatic agents are required. In these or other embodiments, the amount of antistatic agent other than the carbon fibers may be less than about 0.5 pbw phf, in other embodiments, less than about 0.1 pbw phf, based upon the total weight of the fiber blend. In one or more embodiments, the fiber blend is devoid of antistatic agents other than the carbon fibers.

In one or more embodiments of the present invention, the fiber blend may include one or more optional ingredients. Examples of optional components include additional fibers, such as fibers made from nylon, cotton, polyester, glass, carbon, and mixtures thereof, and additives such as processing modifiers, partitioning agents, anti-static enhancers, and performance enhancers. More specific examples of optional additives include waxes, fatty acids, fatty acid esters, processing oils, soaps, homogenizing agents, silica, pyrolytic graphite, conductive carbon black, powdered polytetrafluoroethylene (PTFE), silane coupling agents, bonding resins, low molecular weight polymers, and friction modifiers.

In one or more embodiments, the fiber blend includes from 0 to about 10 pbw phf of silica. In these or other embodiments, the fiber blend includes from 0 to about 5 pbw phf of pyrolytic graphite. In these or other embodiments, the fiber blend includes from 0 to about 5 pbw phf of conductive carbon black. In these or other embodiments, the fiber blend includes from 0 to about 50 pbw phf of PTFE.

In one or more embodiments, the fiber blend may optionally include one or more partitioning agents. Partitioning agents include additives that aid in fiber separation and dispersion. In one or more embodiments, the partitioning agent inhibits caking and clumping of the fiber blend and promotes flowability in dry fiber blends.

Examples of partitioning agents include silica fillers such as synthetic, fumed silica. In one or more embodiments, the silica may be characterized by a surface area of about 200 square meters per gram ($m^2/g$). In one or more embodiments, the silica may be characterized by a particle size such that about 99.9% of the particles pass through a 325 mech (44 micron) screen in a sieve residue test. In one or more embodiments, for a given volume of silica, about 94% of the volume is void volume, i.e. air. Examples of commercially available silica includes Cabosil, available from Cabot.

In one or more embodiments, the partitioning agent may be present in an amount of from about 0.1 to about 5 pbw phf, based upon the total weight of the fiber blend. In other embodiments, the fiber blend contains from about 0.5 to about 4 pbw phf, in other embodiments from about 0.7 to about 3 pbw phf, and in still other embodiments from about 1 to about 2 pbw phf of a partitioning agent, based upon the total weight of the fiber blend.

In one or more embodiments, the micronized fibers and/or the carbon fibers act as partitioning agents for the highly fibrillated fibers, such that no additional partitioning agents are required. In these or other embodiments, the amount of partitioning agent may be less than about 0.5 pbw phf, in other embodiments, less than about 0.1 pbw phf, based upon the total weight of the fiber blend. In one or more embodiments, the fiber blend is devoid of partitioning agents other than the micronized fibers and the carbon fibers.

In one or more embodiments, the fibers are mixed together using standard fiber mixing techniques, and a homogeneous fiber blend is achieved. In one or more embodiments, the homogeneity of the fiber blend is visually detectable. For example, stratification or layering of the fibers is not observed in homogeneous blends. In one or more embodiments, the homogeneity of a blend can be determined by employing a separation analysis based on density differences among the fibers. Examples of separation tests that may be employed include static, aged, and shaken tests typically conducted for fiber mixtures, as well as a modified ASTM Sieve residue test with selected screens to establish the persistence of the blend. In one or more embodiments, the fiber blend may be compacted and pelletized to facilitate storage and handling.

Advantageously, embodiments of the present invention provide a homogeneous, intimate blend of a plurality of types of fibers, each capable of contributing to the overall properties of the fiber blend. Advantageously, by selecting fibers having differing geometries and sizes, a homogenous blend is achieved, wherein it is believed that at least some of the micronized fibers and carbon fibers fill in the voids created by the irregular, branched geometry of the highly-fibrillated fibers.

Thus, in one or more embodiments, the amount of micronized fibers in the fiber blend may be selected relative to the amount of highly-fibrillated fibers in the fiber blend. In one or more embodiments, including embodiments wherein carbon fibers are employed, the combined amount of micronized fibers and carbon fibers may be selected relative to the amount of highly-fibrillated fibers in the fiber blend.

In one or more embodiments, the amount of highly-fibrillated fibers and micronized fibers may be expressed as a ratio, based upon weight. In one or more embodiments, the weight ratio of highly-fibrillated fibers to micronized fibers is from about 1:0.25 to about 1:20, in other embodiments, the ratio is from about 1:0.5 to about 1:5.

In one or more embodiments, the weight ratio of highly-fibrillated fibers to micronized fibers is from about 1:0.3 to about 1:25, in other embodiments, the ratio is from about 1:0.5 to about 1:10.

In one or more embodiments, the amount of highly fibrillated fibers relative to the amount of carbon fibers, on a weight ratio basis (weight of highly fibrillated fibers: weight of carbon fibers), is from about 1:0 to about 1:3.

In one or more embodiments, the total amount of aramid fibers (including both highly fibrillated and non-fibrillated) relative to the amount of carbon fibers, on a weight ratio basis (weight of aramid fibers:weight of carbon fibers), is from about 1:0.01 to about 1:0.2.

Advantageously, the fiber blends of the present invention enable proportionately higher amounts of highly fibrillated aramid fibers to be homogenously dispersed into polymer compositions. Importantly, it is not necessary to form a concentrated pre-mix of fibers and polymer. The fiber blend may be added directly to the polymer without pre-mixing.

Fiber blends of the present invention can be used in a variety of polymer compositions comprising thermoplastics, thermosets, or crosslinkable polymers. In one or more embodiments, the polymer may be a thermoplastic or thermoset polymer or combinations thereof. Examples of suitable polymers include vulcanizable polymers, such as natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber (TM), urethane rubber, silicone rubber, epichlorohydrin rubber, copolymers of ethylene oxide and chloromethyloxirane (ECO), fluoroelastomers, chlorosulfonated polyethylene (CSM), chloropolyethylene, styrene-chloroprene, ethylene-propylene rubber (EPM), ethylene-propylene-diene terpolymer (EPDM), acrylate-butadiene rubber (ABR), acrylic rubber (ACM), nitroso rubber (AFMU), ethylacrylate-acrylonitrile rubber (ANM), aklylene sulfide rubber (ASR), urethane rubber based on polyester (AU), urethane rubber based on polyether (EU), bromobutyl rubber (BIIR), chlorobutyl rubber (CIIR), hydrogenated acrylonitrile-butadiene rubber, and mixtures thereof. In one or more embodiments, the polymer includes EPDM.

Further examples of suitable polymers include polyethylene, polypropylene, polyvinyl chloride, polystyrene, epichlorohydrin-ethyleneoxide terpolymer, ethylene-propylene copolymer, ethylene-vinylacetate copolymer (EVM), tetrafluoroethylene (TFE), acrylonitrile, and acrylonitrile-butadiene-styrene copolymer, and other copolymers and terpolymers thereof.

Thus, the present invention provides a method of preparing a polymer composite, the method comprising the steps of combining one or more polymers, a fiber blend comprising highly fibrillated fibers, non-fibrillated fibers, and carbon fibers, and mixing to form a homogenous polymer composite, wherein the fiber blend is added directly to the polymers and is not pre-mixed with polymer.

In one or more embodiments, the polymer composite may further include one or more optional ingredients, including fillers, processing oils, plasticizers, antidegradants, inhibitors, accelerators, catalysts, colorants, and the like.

In one or more embodiments, the fiber blend is added in the amount of from about 2 to about 40 pbw per 100 parts by weight polymer (php). In other embodiments, the amount of fiber blend employed in thermoplastic compositions could be much higher. In one or more embodiments, the fiber blend is added to the polymer in a single mixing step, and in a single mixer. Pre-mixed concentrates of polymer and fiber are not required.

The present invention further provides a method of preparing a rubber composition. The method includes the step of combining, in a first mixing stage, ingredients including one or more vulcanizable polymers, a fiber blend comprising highly fibrillated fibers, non-fibrillated fibers, and carbon fibers, to form a homogenous vulcanizable polymer mixture. The vulcanizable polymer mixture is combined with ingredients including one or more curatives, and then cured. Advantageously, the fiber blend is added directly to the polymers and is not pre-mixed with polymer.

In one or more embodiments, the curative may include sulfur, peroxide, metallic oxide, urethane crosslinkers, acetoxysilane, or mixtures thereof. In one or more embodiments, the rubber composition may further comprise one or more optional ingredients, including carbon black, silica, accelerants, activators, antidegradants, retarders, processing oils, and the like.

The polymer compositions prepared according to the present invention may be employed a wide variety of products, including belts, hoses, MRG parts (mechanical rubber goods), wear pads, brake components, track and tread pads, such as for tanks and caterpillar type tracks, tire components, such as rim strips, bead fillers, and the like.

In one or more embodiments, the fiber blends of the present invention have improved dispersion into polymer compositions. This improved dispersion results in a reduction in the mixing time and/or in the number of passes that are normally required in order to produce a homogeneous polymer composite and good dispersion of the fibers. Reduced mixing time can result in less polymer degradation. Improved dispersion of the fibers throughout the polymer composite can result in less waste and more consistent properties from batch to batch.

In one or more embodiments, the fiber blends of the present invention have a reduced tendency of fibers to develop a static charge during processing. In one or more embodiments, the fiber blends of the present invention have a reduced tendency of the fibers to clump together during mixing and/or storage.

One or more embodiments comprising highly-fibrillated fibers and micronized fibers have less heat build-up when blended with polymer than when either one of those types of fibers are used individually. Rubber compositions prepared according to the invention exhibit less hysteresis. In one or more embodiments, rubber compositions prepared according to the methods of the present invention exhibit one or more improved properties, including higher tear strength, higher tensile strength, better resistance to abrasion (DIN), higher flex to failure life, lower loss moduli, lower compliance and tan delta values, when compared to compositions prepared with un-blended aramid pulp.

In one or more embodiments, polymer composites produced according to the methods of the present invention have increased strength and improved mechanical properties.

In one or more embodiments, because the fiber blend can be added directly to the polymer, the amount of fiber in the composite may be easily selected for an optimal balance of desired properties. In one or more embodiments, the simplicity and flexibility of the present methods makes it possible to more readily optimize a polymer composite, including the specific gravity, density, and bulk density of the fiber blend within the composite, to achieve specific properties within the final polymer blend.

All ranges stated in this specification should be interpreted to include the end points, unless otherwise specified.

Various modifications and alterations that do not depart from the scope and spirit of this invention will become apparent to those skilled in the art. This invention is not to be duly limited to the illustrative embodiments set forth herein.

We claim:

1. A dispersible fiber blend comprising:
   fibrillated aramid fibers having an average length of from about 0.1 to about 8 mm;
   non-fibrillated aramid fibers having an average length of from about 50 to about 2000 microns; and
   an anti-static agent, wherein the weight ratio of fibrillated fibers to non-fibrillated fibers is from about 1:0.25 to about 1:25 and wherein the fiber blend is dispersible into polymer compositions homogeneously without pre-mixing.

2. The fiber blend of claim 1, wherein the weight ratio of total aramid fibers to anti-static agent is from about 1:0.01 to about 1:0.2.

3. The fiber blend of claim 1, wherein the fibrillated fibers are present in an amount of from about 5 to about 95 parts by weight, per hundred parts fibers.

4. The fiber blend of claim 1, wherein the fibrillated aramid fibers have a specific surface area of from about 4 to about 15.5 $m^2/g$.

5. The fiber blend of claim 1, wherein the non-fibrillated aramid fibers have an average length of from about 100 to about 1000 microns.

6. The fiber blend of claim 1, wherein the non-fibrillated aramid fibers have a specific surface area of from about 0.5 to about 2.5 $m^2/g$.

7. The fiber blend of claim 1, wherein the anti-static agent is selected from the group consisting of carbon fibers, pyrolytic graphite, and conductive carbon black.

8. The fiber blend of claim 7, wherein the carbon fibers have an average length of from about 50 to about 500 microns.

9. The fiber blend of claim 1, wherein the blend further comprises one or more ingredients selected from the group consisting of:
   (a) from 0 to about 10 pbw phf of silica,
   (b) from 0 to about 5 pbw phf of pyrolytic graphite, and
   (c) from 0 to about 50 pbw phf of PTFE, with the proviso that the amount of at least one of (a), (b) and (c) is greater than zero.

10. A method of preparing a polymer composite, the method comprising the steps of:
    combining one or more polymers, and a fiber blend comprising fibrillated aramid fibers having an average length of from about 0.1 to about 8 mm, non-fibrillated aramid fibers having an average length of from about 50 to about 2000 microns, and an antistatic agent, wherein the weight ratio of fibrillated fibers to non-fibrillated fibers is from about 1:0.25 to about 1:25; and
    mixing to form a homogenous polymer composite.

11. The method of claim 10, wherein the weight ratio of total aramid fibers to anti-static agent is from about 1:0.01 to about 1:0.2.

12. The method of claim 10, wherein the non-fibrillated aramid fibers have an average length of from about 100 to about 1000 microns, and a specific surface area of from about 0.5 to about 2.5 m$^2$/g.

13. The method of claim 10, wherein the anti-static agent is selected from the group consisting of carbon fibers, pyrolytic graphite, and conductive carbon black.

14. The method of claim 10, wherein the fibrillated fibers are present in an amount of from about 5 to about 95 parts by weight, per hundred parts fibers.

15. A method of preparing a rubber composition, the method comprising the steps of:
   combining, in a first mixing stage, ingredients including one or more vulcanizable polymers, and a fiber blend comprising fibrillated aramid fibers having an average length of from about 0.1 to about 8 mm, non-fibrillated aramid fibers having an average length of from about 50 to about 2000 microns, and an antistatic agent, wherein the weight ratio of fibrillated fibers to non-fibrillated fibers is from about 1:0.25 to about 1:25, to form a homogenous vulcanizable polymer mixture,
   combining the vulcanizable polymer mixture with ingredients including one or more curatives, and
   curing the vulcanizable polymer mixture.

16. The method of claim 15, wherein the weight ratio of total aramid fibers to anti-static agent is from about 1:0.01 to about 1:0.2.

17. The method of claim 15, wherein the non-fibrillated aramid fibers have an average length of from about 100 to about 1000 microns, and a specific surface area of from about 0.5 to about 2.5 m$^2$/g.

18. The method of claim 15, wherein the anti-static agent is selected from the group consisting of carbon fibers, pyrolytic graphite, and conductive carbon black.

* * * * *